(12) United States Patent
Chang et al.

(10) Patent No.: US 10,606,425 B2
(45) Date of Patent: Mar. 31, 2020

(54) TOUCH PANEL AND METHOD FOR MAKING SAME

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Zhubei (TW)

(72) Inventors: Ya-Ting Chang, Hsinchu (TW); Tai-Wu Lin, Hsinchu (TW); Yen-Chang Yao, Hsinchu (TW); Pang-Chiang Chia, Hsinchu (TW); Yen-Heng Huang, Hsinchu (TW)

(73) Assignees: Interface Technology (ChenDu) Co., Ltd., Chengdu (CN); INTERFACE OPTOELECTRONICS (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 37 days.

(21) Appl. No.: 15/955,810

(22) Filed: Apr. 18, 2018

(65) Prior Publication Data
US 2019/0212841 A1    Jul. 11, 2019

(30) Foreign Application Priority Data
Jan. 5, 2018    (CN) .......................... 2018 1 0011506

(51) Int. Cl.
G06F 3/041    (2006.01)
G06F 3/044    (2006.01)
G06F 3/047    (2006.01)

(52) U.S. Cl.
CPC .............. *G06F 3/044* (2013.01); *G06F 3/047* (2013.01); *G06F 3/0445* (2019.05); *G06F 3/0446* (2019.05); *B32B 2307/202* (2013.01); *B32B 2307/412* (2013.01); *G06F 2203/04103* (2013.01)

(58) Field of Classification Search
CPC ....... G06F 3/0412; G06F 3/0416; G06F 3/044
See application file for complete search history.

(56) References Cited

U.S. PATENT DOCUMENTS

2012/0162099 A1*  6/2012  Yoo ................. G06F 3/0412
                                                          345/173
2017/0115801 A1*  4/2017  Shih ................ G06F 3/0412

* cited by examiner

*Primary Examiner* — Insa Sadio
(74) *Attorney, Agent, or Firm* — ScienBiziP, P.C.

(57) ABSTRACT

A touch panel capable of being simply manufactured includes a foldable substrate, a plurality of touch driving electrodes on the substrate, and a plurality of touch sensing electrodes on the substrate. The substrate includes two laminated layers achieved by folding. The touch driving electrodes are on one of the two laminated layers and the touch sensing electrodes are on the other of the two laminated layers. The touch driving electrodes and the touch sensing electrodes are formed by a same conductive layer on a surface of the substrate.

8 Claims, 10 Drawing Sheets

TOUCH PANEL AND METHOD FOR MAKING SAME

FIELD

The subject matter herein generally relates to a touch panel and a method for making the touch panel.

BACKGROUND

A capacitive touch display device can include a capacitive touch panel. For a conventional mutual capacitive touch panel, there are two kinds of touch electrodes, the touch driving electrode pattern ($T_x$ pattern) and the touch sensing electrode pattern ($R_x$ pattern). However, a method of producing the mutual capacitive touch panel includes one step of forming the $T_x$ pattern and another step of forming the $R_x$ pattern. Thus, the method of producing the mutual capacitive touch panel is complex. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1A:
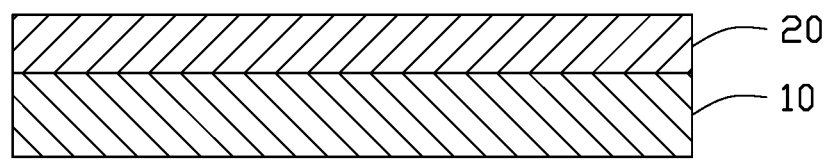
FIG. 1A through FIG. 1D are schematic views illustrating a method for making a touch panel according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

First Embodiment

The method for making a touch panel according to the first embodiment of the present disclosure may include one or more of the following steps.

Step S1: As shown in FIG. 1A, a substrate 10 is provided, and a conductive layer 20 is formed on a surface of the substrate 10. The conductive layer 20 is electrically conductive.

The substrate 10 is foldable or bendable, and can be made of a flexible material. For example, the substrate 10 may be made of a thermoplastic polymer material, such as polyethylene terephthalate (PET). If the conductive layer 20 functions as touch electrodes in a display panel having touch function, the conductive layer 20 is transparent so as not to affect the display effect. The conductive layer 20 may be made of indium tin oxide (ITO). In other embodiments, the conductive layer 20 may also be made of metal mesh, nano silver wires, nano copper wires or the like, which is not limited herein.

Figure 1B:
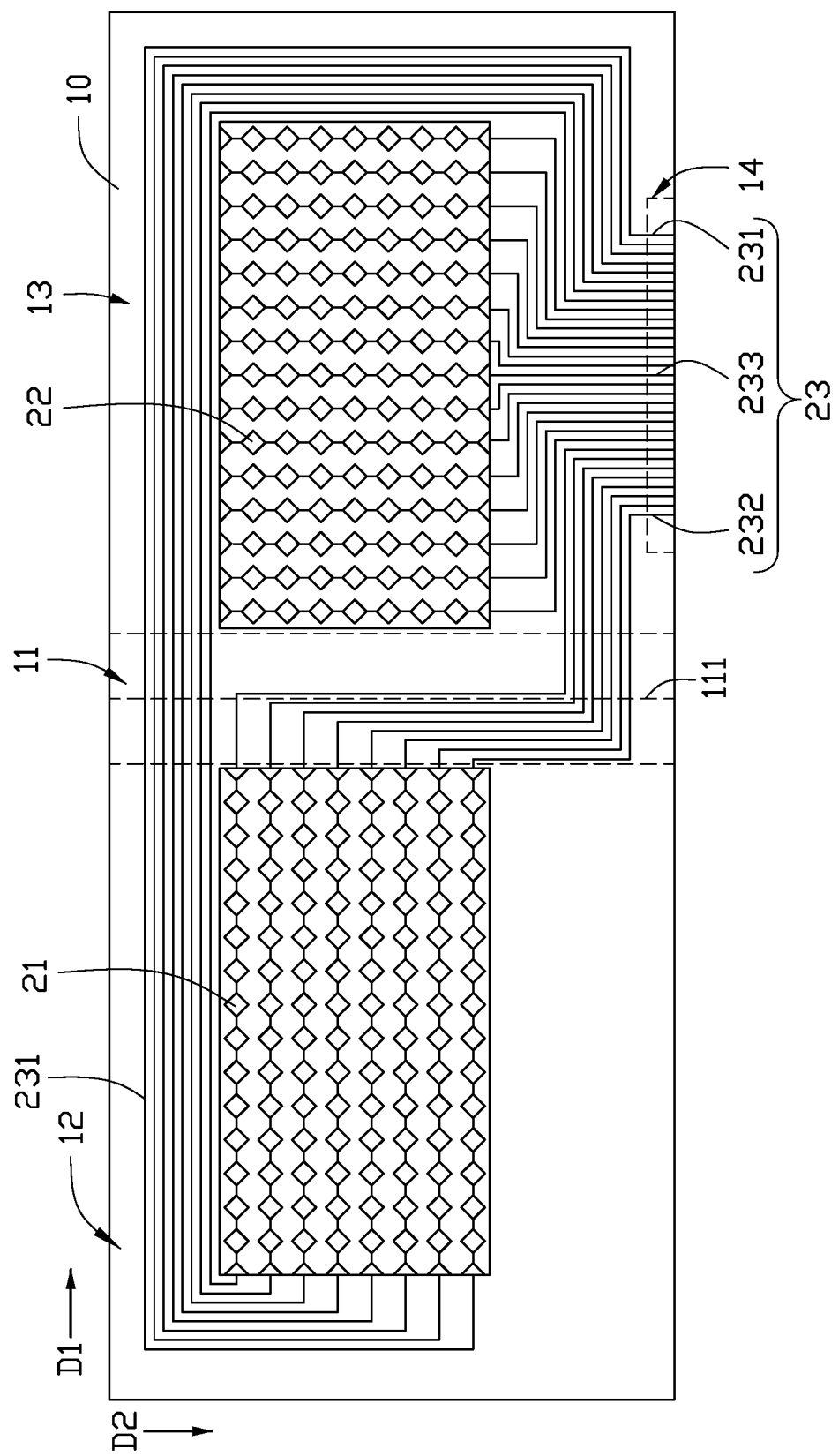

Step S2: as shown in FIG. 1B, the conductive layer 20 is patterned to form a plurality of touch driving electrodes 21 and a plurality of touch sensing electrodes 22 on a same surface of the substrate 10 by a single exposure process and using a single mask.

As shown in FIG. 1B, the touch driving electrodes 21 are located in a first region 12 of the substrate 10 and the touch sensing electrodes 22 are located in a second region 13 of the substrate 10. The first region 12 and the second region 13 are spaced apart from each other by a bending region 11 of the substrate 10. That is, the touch driving electrodes 21 are spaced apart from the touch sensing electrodes 22 by the bending region 11.

The step S2 may include: forming a photoresist layer (not shown) on the conductive layer 20; exposing and developing the photoresist layer by using a mask (not shown) to form a patterned photoresist layer; etching the conductive layer 20 to form the plurality of touch driving electrodes 21 and the plurality of touch sensing electrodes 22 by using the patterned photoresist layer as a mask; and removing the patterning photoresist layer.

In this embodiment, only a single exposure and a single mask are required to form the plurality of touch driving electrodes 21 and the plurality of touch sensing electrodes 22. Thereby, the plurality of touch driving electrodes 21 and the plurality of touch sensing electrodes 22 are formed on the same surface of the substrate 10 at a same time. Therefore, the method for making the touch panel is simple.

As shown in FIG. 1B, the substrate 10 includes the first region 12, the second region 13, and the bending region 11 coupling therebetween. The touch driving electrodes 21 are located in the first region 12. The touch sensing electrodes 22 are located in the second region 13. In this embodiment, the touch driving electrodes 21 are arranged in a plurality of rows and in a plurality of columns. Each row extends in a first direction D1, and each column extends in a second direction D2. The first direction D1 intersects with the second direction D2, in this embodiment, the first direction D1 is perpendicular to the second direction D2. The touch driving electrodes 21 in each row are electrically connected one by one to form a string of touch driving electrodes 21. Any two touch driving electrodes 21 in different rows are electrically insulated from each other. The touch sensing electrodes 22 are arranged in a plurality of rows and in a plurality of columns. The touch sensing electrodes 22 in each column are electrically connected one by one to form a string of touch sensing electrodes 22. Any two touch sensing electrodes 22 in different columns are electrically insulated from each other. In this embodiment, as shown in FIG. 1B, each touch driving electrode 21 and each touch sensing electrode 22 have rhombus shape. In other embodiments, each touch driving electrode 21 and each touch sensing electrode 22 may also have other shapes. For example, each string of touch driving electrodes 21 may extend as a strip in the first direction D1, and each string of touch sensing electrodes 22 may extend as a strip in the second direction D2.

In additional, when patterning the conductive layer 20, it is not only the touch driving electrodes 21 and the touch sensing electrodes 22 which are formed, but a plurality of traces 23 can be formed at a same time. Each trace 23 is electrically coupled to one string of touch driving electrodes 21 or one string of touch sensing electrodes 22.

The mask used in step S2 when patterning the conductive layer 20 defines not only patterns for the touch driving electrodes 21 and the touch sensing electrodes 22, but also patterns for the traces 23. The patterning process requires only a single mask and a single exposure process. The touch driving electrodes 21, the touch sensing electrodes 22, and the traces 23 can be formed on the same surface of the substrate 10 at a same time. Therefore, the method for making the touch panel is simple.

Further, the traces 23 may include three different types, the types being a plurality of first traces 231, a plurality of second traces 232, and a plurality of third traces 233. Each string of touch driving electrodes 21 has one end electrically coupled to one first trace 231 and another end electrically coupled to one second trace 232. Each string of touch sensing electrodes 22 is electrically coupled to a third trace 233. In this embodiment, the second trace 232 is coupled to the end of the string of touch driving electrodes 21 adjacent to the bending region 11.

As shown in FIG. 1B, the substrate 10 further includes a bonding region 14 where the traces 23 are coupled to a flexible circuit board (not shown). The bonding region 14 may be in the first region 12 and not be covered by the touch driving electrodes 21, or may be in the second region 13 and not be covered by the touch sensing electrodes 22. In this embodiment, the bonding region 14 is in the second region 13 and is not covered by the touch sensing electrodes 22. Each trace 23 has one end electrically coupled to one string of touch driving electrodes 21 or the string of touch sensing electrodes 22, and the other end being in the bonding region 14.

As shown in FIG. 1B, each first trace 231 is electrically coupled to the touch driving electrode 21 at one end of one string of touch driving electrodes 21, and extends across the first region 12, the bending region 11, and the second region 13. The first trace 231 then reaches the bonding region 14 in the second region 13 to be bonded to the flexible circuit board (not shown). Each second trace 232 is electrically connected to the touch driving electrode 21 at the other end of one string of touch driving electrodes 21, and extends across the bend region 11 and the second region 13. The second trace 232 then reaches the bonding region 14 in the second region 13 to be bonded to the flexible circuit board (not shown). Each third trace 233 is electrically coupled to the touch sensing electrode 22 at an end of one string of touch sensing electrodes 22 and extends to be in the bonding region 14 to be bonded to the flexible circuit board (not shown).

In this embodiment, since the first traces 231, the second traces 232, and the third traces 233 all extend to the bonding region 14, it is possible to perform all of the traces 23 to be bonded to the flexible circuit board (not shown) at the same surface of the substrate 10. Therefore, the method for making the touch panel is further simplified.

Figure 1C:
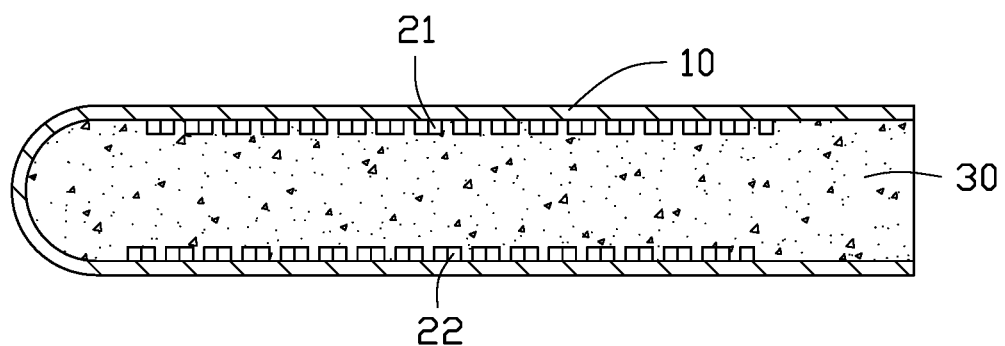

In step S3, the substrate 10 is folded at the bending region 11 to form two laminated layers. The touch driving electrodes 21 and the touch sensing electrodes 22 are arranged on different layers. In this embodiment, as shown in FIG. 1C, the substrate 10 is folded to make the touch driving electrodes 21 and the touch sensing electrodes 22 face to face.

As shown in FIG. 1B, a folding line 111 is defined in the bending region 11. FIG. 1C is a planar view of the substrate 10 shown in FIG. 1B after being folded along the folding line 111. As shown in FIG. 1C, the two laminated layers of the folded substrate 10 are substantially parallel, and the bending region 11 after being folded is arcuate, which avoids the traces 23 which are in the bending region 11 being damaged when the substrate 10 is folded. The touch driving electrodes 21 are formed on a surface of one layer of the folded substrate 10 adjacent to the touch sensing electrodes 22, and the touch sensing electrodes 22 are formed on a surface of other layer of the folded substrate 10 adjacent to the touch driving electrodes 21.

Figure 1D:
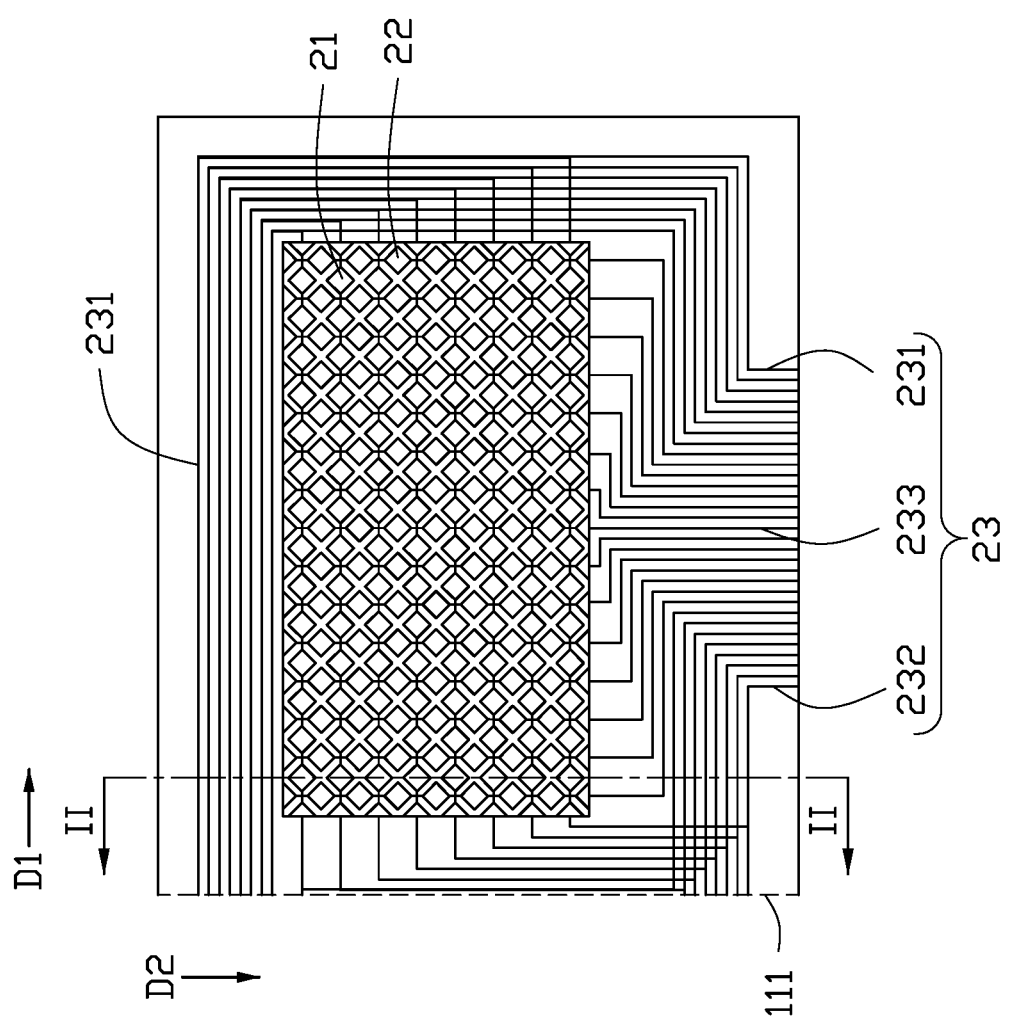

FIG. 1D is a top view of the substrate 10 shown in FIG. 1B after being folded along the folding line 111. As shown in FIG. 1D, each string of touch driving electrodes 21 extending in the first direction D1 and each string of touch sensing electrodes 22 extending in the second direction D2 intersect with each other, to form a mesh. Specifically, except for the touch driving electrodes 21 distributed on the edges of each string of touch driving electrodes 21, the projection of each touch driving electrode 21 on the second region 13 is located between two adjacent strings of touch sensing electrodes 22. Except for the touch sensing electrodes 22 distributed on the edges of each string of touch sensing electrodes 22, the projection of each touch sensing electrode 22 on the second region 13 is located between two adjacent strings of touch sensing electrodes 22. In other embodiments, the touch driving electrodes 21 and the touch sensing electrodes 22 may be arranged in other manners, which is not limited herein.

Further, before folding the substrate 10, an insulating adhesive 30 is applied to the surface of substrate 10 on which the touch driving electrodes 21 and the touch sensing electrodes 22 are formed. Thus, as shown in FIG. 1C, after the substrate 10 is folded, the insulating adhesive 30 is between the touch driving electrodes 21 and the touch sensing electrodes 22 to render the touch driving electrodes 21 and the touch sensing electrodes 22 insulated from each other. The insulating adhesive 30 completely covers the touch driving electrodes 21 and the touch sensing electrodes 22. It can be understood that the insulating adhesive 30 may also be applied between the two laminated layers of the substrate 10 after the substrate 10 is folded.

Figure 2:
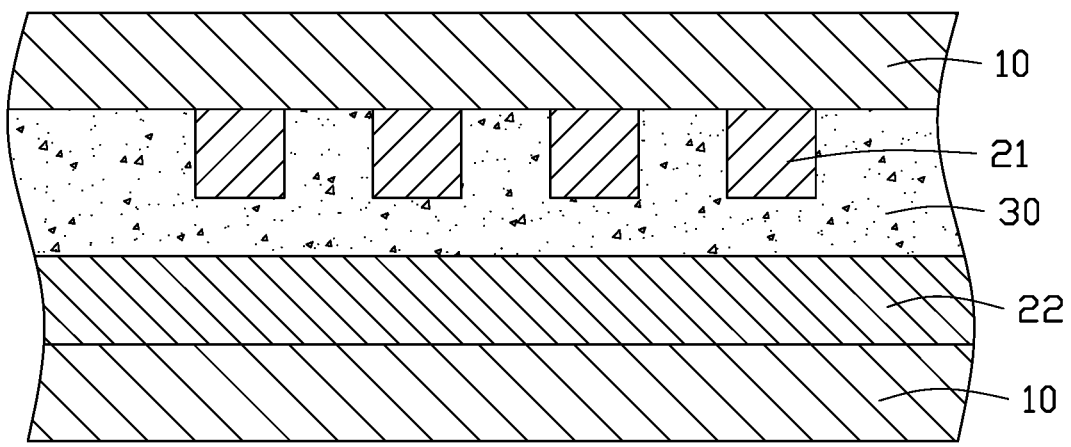
FIG. 2 is a cross-sectional view of the touch panel of FIG. 1D taken along line II-II.

FIG. 2 is a cross-sectional view of FIG. 1D taken along line II-II. The touch driving electrodes 21 and the touch sensing electrodes 22 are arranged face to face, and the insulating adhesive 30 bonds the two laminated layers of the folded substrate 10 together. The plurality of touch driving electrodes 21 is spaced apart from the plurality of touch sensing electrodes 22 by the insulating adhesive 30.

In this embodiment, the insulating adhesive 30 is used as a dielectric layer between the touch driving electrodes 21 and the touch sensing electrodes 22, so that the touch driving electrodes 21 and the touch sensing electrodes 22 cooperatively form a mutual capacitive touch sensing structure. When a touch occurs on the touch panel, the coupling capacitance between the touch driving electrode and the touch sensing electrode in the vicinity of the touch point would varies, resulting in a variation in the sensed current or voltage value related to mutual capacitance, and thus the coordinates of each touch point can be obtained.

The insulating adhesive 30 is transparent. For example, the insulating adhesive 30 may be, but is not limited to, such as optical clear adhesive (OCA).

Second Embodiment

The method for making a touch panel according to the second embodiment of the present disclosure may include one or more of the following steps.

Figure 3A:
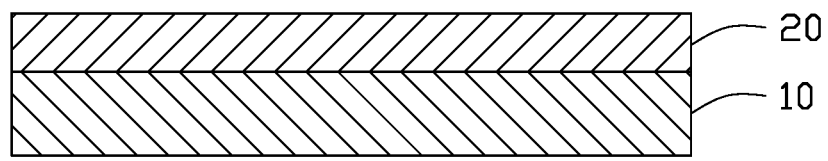
FIG. 3A through FIG. 3D are schematic views illustrating a method for making a touch panel according to a second embodiment of the present disclosure.

Step S1: As shown in FIG. 3A, a substrate 10 is provided, and a conductive layer 20 is formed on a surface of the substrate 10.

The substrate 10 is foldable or bendable, and can be made of a flexible material. For example, the substrate 10 may be made of a thermoplastic polymer material, such as polyethylene terephthalate (PET). When the conductive layer 20 is used as touch electrodes in a display panel having touch function, the conductive layer 20 is transparent so as not to affect the display effect. The conductive layer 20 may be made of indium tin oxide (ITO). In other embodiments, the conductive layer 20 may also be made of metal mesh, nano silver wires, nano copper wires or the like, which is not limited herein.

Figure 3B:
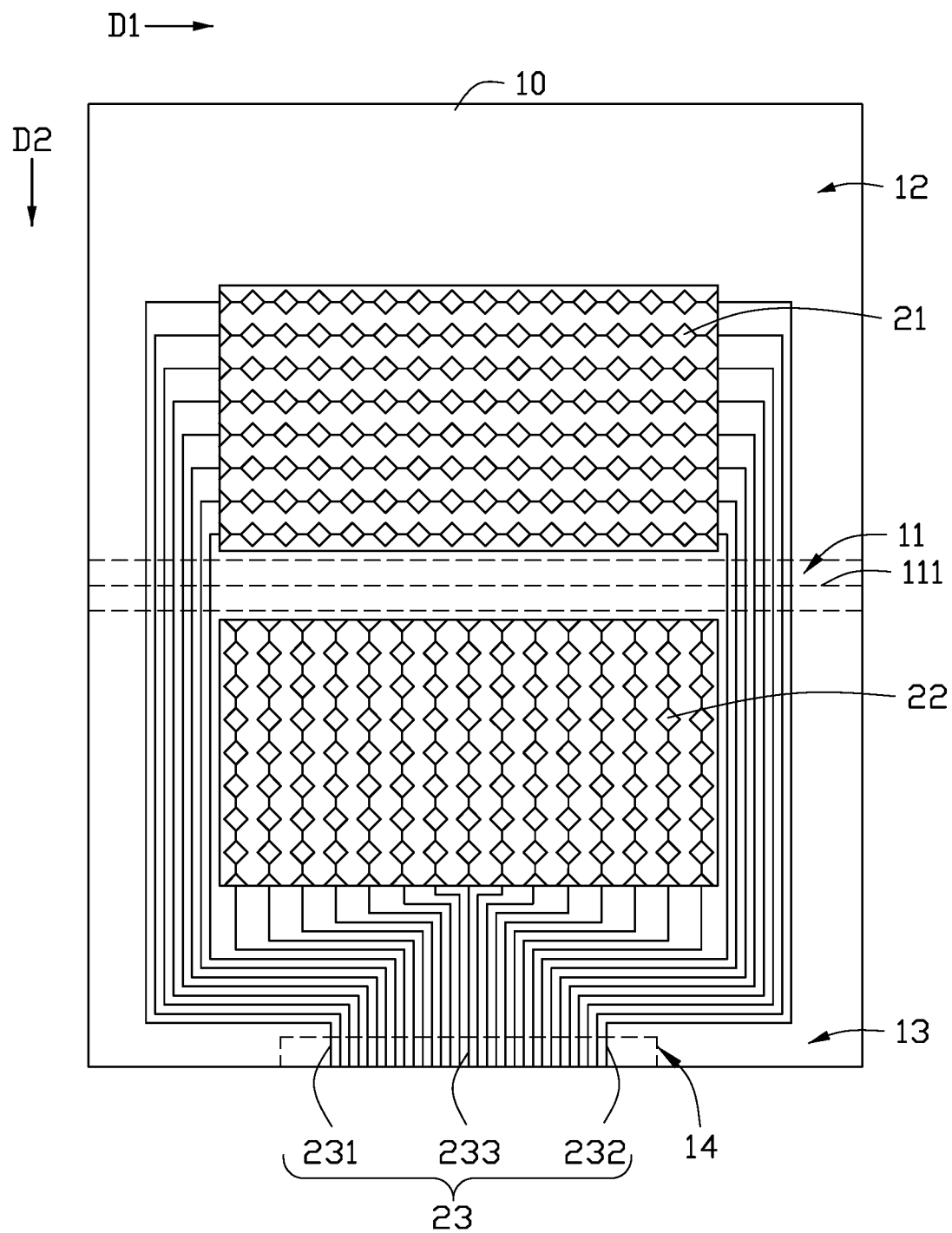

Step S2: as shown in FIG. 3B, the conductive layer 20 is patterned to form a plurality of touch driving electrodes 21 and a plurality of touch sensing electrodes 22 on the same surface of the substrate 10 by a single exposure process and using a single mask.

As shown in FIG. 3B, the touch driving electrodes 21 are located in a first region 12 of the substrate 10 and the touch sensing electrodes 22 are located in a second region 13 of the substrate 10. The first region 12 and the second region 13 are spaced apart from each other by a bending region 11 of the substrate 10. That is, the touch driving electrodes 21 are spaced apart from the touch sensing electrodes 22 by the bending region 11.

The step S2 may include: forming a photoresist layer (not shown) on the conductive layer 20; exposing and developing the photoresist layer by using a mask (not shown) to form a patterned photoresist layer; etching the conductive layer 20 to form the plurality of touch driving electrodes 21 and the plurality of touch sensing electrodes 22 by using the patterned photoresist layer as a mask; and removing the patterning photoresist layer.

In this embodiment, only a single exposure process and only one single mask are required to form the plurality of touch driving electrodes 21 and the plurality of touch sensing electrodes 22. The plurality of touch driving electrodes 21 and the plurality of touch sensing electrodes 22 are formed on the same surface of the substrate 10 at a same time. Therefore, the method for making the touch panel is simple.

As shown in FIG. 3B, the substrate 10 includes the first region 12, the second region 13, and the bending region 11 coupling therebetween. The touch driving electrodes 21 are located in the first region 12. The touch sensing electrodes 22 are located in the second region 13. In this embodiment, the touch driving electrodes 21 are arranged in a plurality of rows and in a plurality of columns. Each row extends in a first direction D1, and each column extends in a second direction D2. The first direction D1 intersects with the second direction D2, in this embodiment, the first direction D1 is perpendicular to the second direction D2. The touch driving electrodes 21 in each row are electrically connected one by one to form a string of touch driving electrodes 21. Any two touch driving electrodes 21 in different rows are electrically insulated from each other. The touch sensing electrodes 22 are arranged in a plurality of rows and in a plurality of columns. The touch sensing electrodes 22 in each column are electrically connected one by one to form a string of touch sensing electrodes 22. Any two touch sensing electrodes 22 in different columns are electrically insulated from each other. In this embodiment, as shown in FIG. 3B, each touch driving electrode 21 and each touch sensing electrode 22 has rhombus shape. In other embodiments, each touch driving electrode 21 and each touch sensing electrode 22 may also have other shapes. For example, each string of touch driving electrodes 21 may extend as a strip in the first direction D1, and each string of touch sensing electrodes 22 may extend as a strip in the second direction D2.

In addition, when patterning the conductive layer 20, not only the touch driving electrodes 21 and the touch sensing electrodes 22 are formed, but also a plurality of traces 23 can be formed at a same time. Each trace 23 is electrically coupled to one string of touch driving electrodes 21 or one string of touch sensing electrodes 22.

The mask used in step S2 when patterning the conductive layer 20 defines not only patterns for the touch driving electrodes 21 and the touch sensing electrodes 22, but also patterns for the traces 23. The patterning process requires only a single mask and a single exposure process. The touch driving electrodes 21, the touch sensing electrodes 22, and the traces 23 can be formed on the same surface of the substrate 10 at a same time. Therefore, the method for making the touch panel is simple.

Further, the traces 23 may include three different types. The types are a plurality of first traces 231, a plurality of second traces 232, and a plurality of third traces 233. Each string of touch driving electrodes 21 has one end electrically coupled to one first trace 231 and another end electrically coupled to one second trace 232. Each string of touch sensing electrodes 22 is electrically coupled to a third trace 233.

As shown in FIG. 3B, the substrate 10 further includes a bonding region 14 where the traces 23 are coupled to a flexible circuit board (not shown). The bonding region 14 may be in the first region 12 and not be covered by the touch driving electrodes 21, or may be in the second region 13 and not be covered by the touch sensing electrodes 22. In this embodiment, the bonding region 14 is in the second region 13 and is not covered by the touch sensing electrodes 22. Each trace 23 has one end electrically coupled to one string of touch driving electrodes 21 or to one string of touch sensing electrodes 22 and the other end in the bonding region 14.

As shown in FIG. 3B, each first trace 231 is electrically coupled to the touch driving electrode 21 at one end of one string of touch driving electrodes 21, and extends across the first region 12, the bending region 11, and the second region 13. The first trace 231 then reaches the bonding region 14 in the second region 13 to be bonded to the flexible circuit board (not shown). Each second trace 232 is electrically connected to the touch driving electrode 21 at the other end of one string of touch driving electrodes 21, and extends across the first region 12, the bending region 11, and the second region 13. The second trace 232 then reaches the bonding region 14 in the second region 13 to be bonded to the flexible circuit board (not shown). Each third trace 233 is electrically coupled to the touch sensing electrode 22 at an end of one string of touch sensing electrodes 22 and extends to be in the bonding region 14 to be bonded to the flexible circuit board (not shown).

In this embodiment, since the first traces 231, the second traces 232, and the third traces 233 all extend to the bonding region 14, it is possible to form all of the traces 23 for bonding to the flexible circuit board (not shown) at the same surface of the substrate 10. Therefore, the method for making the touch panel is furtherly simplified.

In step S3, the substrate 10 is folded at the bending region 11 to form two laminated layers. The touch driving electrodes 21 and the touch sensing electrodes 22 are arranged on different laminated layers of the folded substrate 10. In this embodiment, the substrate 10 is folded to place the touch driving electrodes 21 and the touch sensing electrodes 22 back to back.

Figure 3C:
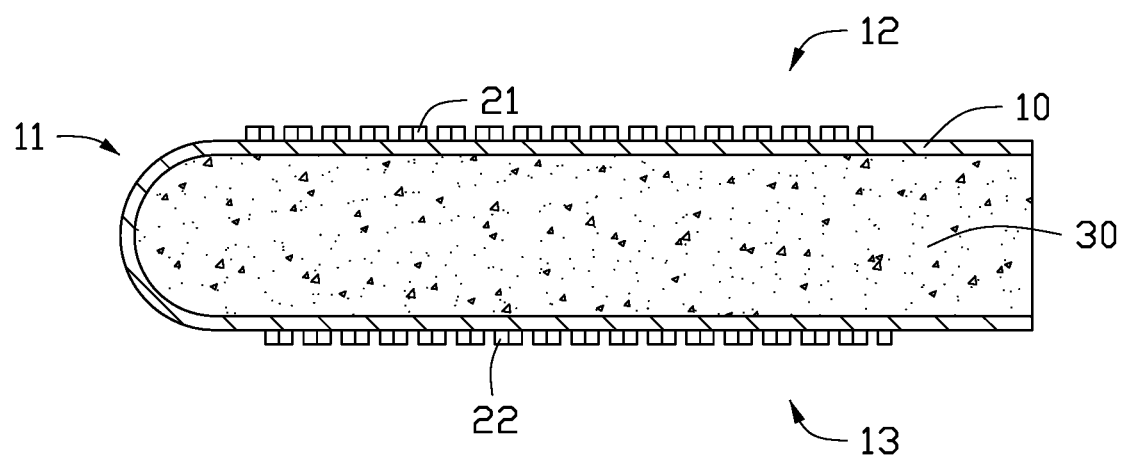

As shown in FIG. 3B, a folding line 111 is defined in the bending region 11. FIG. 3C is a planar view of the substrate 10 shown in FIG. 3B after being folded along the folding line 111. As shown in FIG. 3C, the two laminated layers of the folded substrate 10 are substantially parallel, and the bending region 11 after being folded is arcuate. This avoids the traces 23 which extend into the bending region 11 being damaged when the substrate 10 is folded. As shown in FIG. 3C, the touch driving electrodes 21 are formed on a surface of one layer of the folded substrate 10 away from the touch sensing electrodes 22, and the touch sensing electrodes 22 are formed on a surface of other layer of the folded substrate 10 which is away from the touch driving electrodes 21.

Figure 3D:
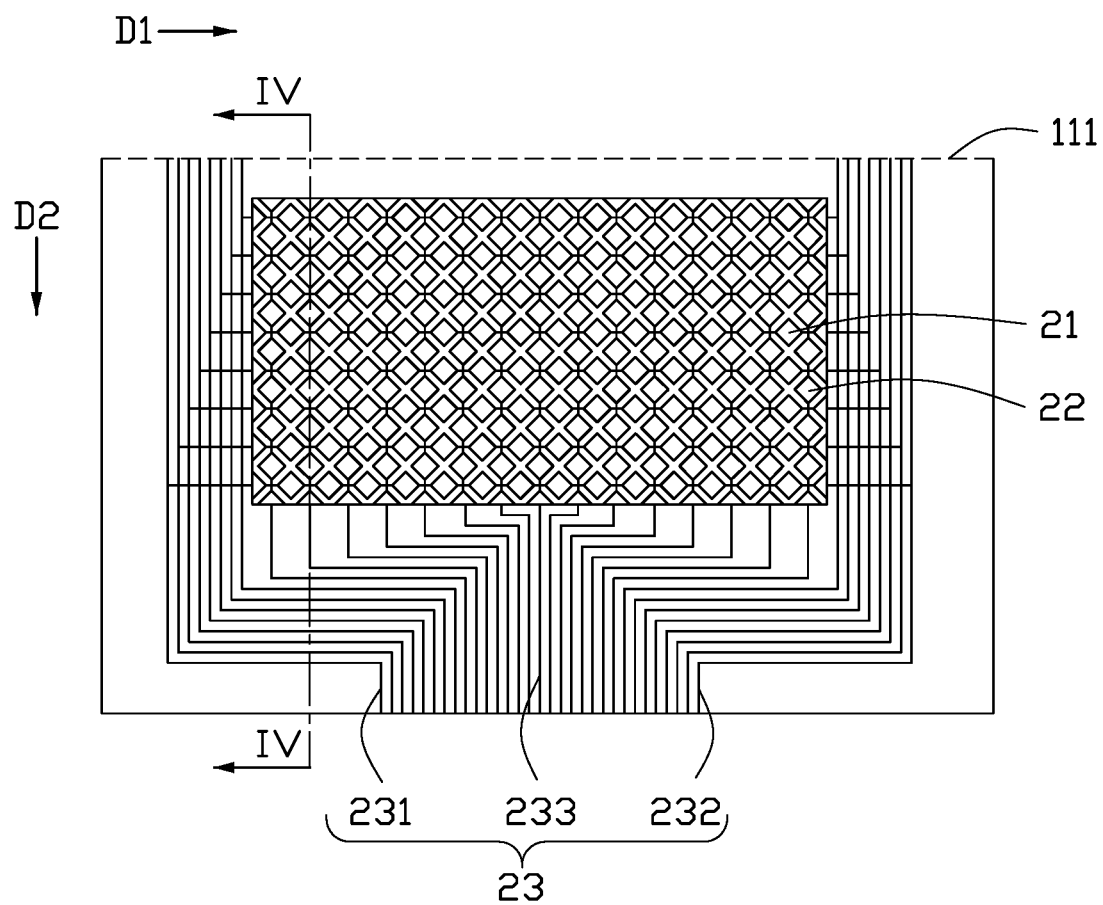

FIG. 3D is a top view of the substrate 10 shown in FIG. 3B after being folded along the folding line 111. As shown in FIG. 3D, each string of touch driving electrodes 21 extending in the first direction D1 and each string of touch sensing electrodes 22 extending in the second direction D2 intersect with each other, to form a mesh. Specifically, except for the touch driving electrodes 21 distributed on the edges of each string of touch driving electrodes 21, the projection of each touch driving electrode 21 on the second region 13 is located between two adjacent strings of touch sensing electrodes 22. Except for the touch sensing electrodes 22 distributed on the edges of each string of touch sensing electrodes 22, the projection of each touch sensing electrode 22 on the second region 13 is located between two adjacent strings of touch sensing electrodes 22. In other embodiments, the touch driving electrodes 21 and the touch sensing electrodes 22 may be arranged in other manners, which is not limited herein.

Further, before folding the substrate 10, an insulating adhesive 30 is applied to a surface of substrate 10 away from the touch driving electrodes 21 and the touch sensing electrodes 22. Thus, as shown in FIG. 3C, after the substrate 10 is folded, the insulating adhesive 30 is formed between the two laminated layers of the folded substrate 10. The insulating adhesive 30 may also be applied between the two laminated layers after the substrate 10 is folded. In this embodiment, the insulating adhesive 30 is spaced apart from the touch driving electrodes 21 and the touch sensing electrodes 22, this is different from the first embodiment. It can be understood that the insulating adhesive 30 may also be applied to the substrate 10 after the substrate 10 is folded.

Figure 4:
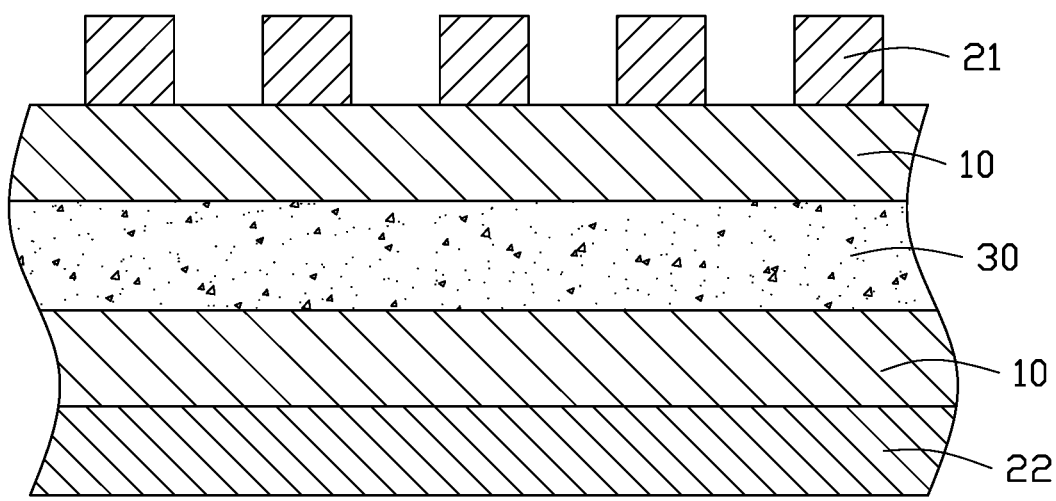
FIG. 4 is a cross-sectional view of the touch panel of FIG. 3D taken along line IV-IV.

FIG. 4 is a cross-sectional view of FIG. 3D taken along line IV-IV. The touch driving electrodes 21 and the touch sensing electrodes 22 are arranged back to back, and the insulating adhesive 30 is bonding the two laminated layers of the folded substrate 10 together. The plurality of touch driving electrodes 21 is spaced apart from the plurality of touch sensing electrodes 22 by the two laminated layers of the folded substrate 10 and the insulating adhesive 30.

In this embodiment, the insulating adhesive 30 is used as a dielectric layer between the touch driving electrodes 21 and the touch sensing electrodes 22, so that the touch driving electrodes 21 and the touch sensing electrodes 22 cooperatively form a mutual capacitive touch sensing structure. When a touch occurs on the touch panel, the coupling capacitance between the touch driving electrode and the touch sensing electrode in the vicinity of the touch point will vary, resulting in a variation in the sensed current or voltage value related to mutual capacitance, and thus the coordinates of each touch point can be obtained.

The insulating adhesive 30 is transparent. For example, the insulating adhesive 30 may be, but is not limited to, optical clear adhesive (OCA).

In other embodiments, an arrangement of the traces 23 may be the same as that in the first embodiment or in the second embodiment. The coating position of the insulating adhesive 30 may be the same as that in the first embodiment or the second embodiment.

The present disclosure further provides a touch panel made by the above described methods. As shown in FIG. 1C and FIG. 3C, each touch panel includes a substrate 10, and a plurality of touch driving electrodes 21 and a plurality of touch sensing electrodes 22 formed on the substrate 10. The substrate 10 is folded to form two laminated layers, the touch driving electrodes 21 and the touch sensing electrodes 22 being formed on different laminated layers of the folded substrate 10. The touch driving electrodes 21 and the touch sensing electrodes 22 are formed by patterning the same conductive layer 20 on a surface of the substrate 10.

The substrate 10 is foldable and made of material with a high flexural strength or a flexible material. For example, the substrate 10 may be made of a thermoplastic polymer material, such as polyethylene terephthalate (PET). The touch driving electrodes 21 and the touch sensing electrodes 22 are transparent and made of indium tin oxide (ITO). In other embodiments, the touch driving electrodes 21 and the touch sensing electrodes 22 may also be made of metal mesh, nano silver wires, nano copper wires, or the like, which is not limited herein.

As shown in FIG. 1C and FIG. 3C, each touch panel further includes an insulating adhesive 30 between the two laminated layers of the folded substrate 10. The insulating adhesive 30 bonds the two laminated layers of the folded substrate 10 together.

As shown in FIG. 1C, the folding of the substrate 10 places the touch driving electrodes 21 and the touch sensing electrodes 22 face to face. The touch driving electrodes 21 are formed on a surface of one layer of the folded substrate 10 adjacent to the touch sensing electrodes 22, and the touch sensing electrodes 22 are formed on a surface of other layer of the folded substrate 10 adjacent to the touch driving electrodes 21. The insulating adhesive 30 is between and in direct contact with the touch driving electrodes 21 and the touch sensing electrodes 22, thus the touch driving electrodes 21 and the touch sensing electrodes 22 are insulated from each other.

As shown in FIG. 3C, the folding of the substrate 10 places the touch driving electrodes 21 and the touch sensing electrodes 22 back to back. The touch driving electrodes 21 are formed on a surface of one layer of the folded substrate 10 away from the touch sensing electrodes 22, and the touch sensing electrodes 22 are formed on a surface of other layer of the folded substrate 10 away from the touch driving electrodes 21. The insulating adhesive 30 is spaced apart from the touch driving electrodes 21 and the touch sensing electrodes 22. The two laminated layers of the folded substrate 10 and the insulating adhesive 30 are between the touch driving electrodes 21 and the touch sensing electrodes 22.

As shown in FIG. 1D and FIG. 3D, the touch driving electrodes 21 are arranged in a plurality of rows and in a plurality of columns. Each row extends in a first direction D1, and each column extends in a second direction D2. The first direction D1 intersects with the second direction D2, the first direction D1 is perpendicular to the second direction D2 in this disclosure. The touch driving electrodes 21 in each row are electrically connected one by one to form a string of touch driving electrodes 21. Any two touch driving electrodes 21 in different rows are electrically insulated from each other. The touch sensing electrodes 22 are arranged in a plurality of rows and in a plurality of columns. The touch sensing electrodes 22 in each column are electrically connected one by one to form a string of touch sensing electrodes 22. Any two touch sensing electrodes 22 in different columns are electrically insulated from each other.

As shown in FIG. 1D and FIG. 3D, each touch panel further includes a plurality of traces 23 electrically coupled to the strings of touch driving electrodes 21 and the strings of touch sensing electrodes 22. The traces 23 are also formed by patterning the same conductive layer 20 on the surface of the substrate 10. That is, the touch driving electrodes 21, the touch sensing electrodes 22, and the traces 23 are formed by the same conductive layer 20.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for making a touch panel, comprising:
providing a foldable substrate and forming a conductive layer on a surface of the foldable substrate;
patterning the conductive layer to form a plurality of touch driving electrodes and a plurality of touch sensing electrodes, the substrate comprising a bending region between the plurality of touch driving electrodes and the plurality of touch sensing electrodes, wherein the plurality of touch driving electrodes are spaced apart from the plurality of touch sensing electrodes by the bending region;
applying an insulating adhesive on the substrate; and
folding the foldable substrate into two laminated layers at the bending region to arrange the plurality of touch driving electrodes and the plurality of touch sensing electrodes face to face;
the insulating adhesive being in direct contact with and between the touch driving electrodes and the touch sensing electrodes to insulate the touch driving electrodes from the touch sensing electrodes.

2. The method of claim 1, wherein patterning the conductive layer uses a single mask and by a single exposure process.

3. The method of claim 1, wherein the foldable substrate further comprises a first region and a second region; the bending region is between the first region and the second region; the plurality of touch driving electrodes is in the first region; and the plurality of touch sensing electrodes is in the second region.

4. The method of claim 3, wherein a plurality of traces are formed by patterning the conductive layer, each of the plurality of traces is electrically coupled to one of the plurality of touch driving electrodes or one of the plurality of touch sensing electrodes.

5. The method of claim 4, wherein the foldable substrate further comprises a bonding region; the bonding region is in the first region and not covered by the plurality of touch driving electrodes, or in the second region and not covered by the plurality of touch sensing electrodes; each of the plurality of traces has one end electrically coupled to one of the plurality of touch driving electrodes or one of the plurality of touch sensing electrodes and the other end in the bonding region.

6. The method of claim 5, wherein the plurality of touch driving electrodes are arranged in a plurality of rows each extending in a first direction; the touch driving electrodes in each row are electrically connected one by one to form a string of touch driving electrodes; the plurality of touch sensing electrodes are arranged in a plurality of columns each extending in a second direction intersecting with the first direction; the touch sensing electrodes in each column are electrically connected one by one to form a string of touch sensing electrodes; each of the plurality of traces is electrically coupled to one string of touch driving electrodes or one string of touch sensing electrodes.

7. A touch panel, comprising:
a foldable substrate;
a plurality of touch driving electrodes on the foldable substrate;
a plurality of touch sensing electrodes on the foldable substrate; and
an insulating adhesive;
wherein the foldable substrate comprises two laminated layers by folding; the plurality of touch driving electrodes and the plurality of touch sensing electrodes are arranged face to face; the insulating adhesive is in direct contact with and between the touch driving electrodes and the touch sensing electrodes to insulate the touch driving electrodes from the touch sensing electrodes, and the plurality of touch driving electrodes and the plurality of touch sensing electrodes are formed by a same conductive layer on a surface of the foldable substrate.

8. The touch panel of claim 7, wherein further comprising a plurality of traces on the substrate, wherein each of the plurality of traces is electrically coupled to one of the plurality of touch driving electrodes or one of the plurality of touch sensing electrodes; the plurality of traces are also formed by the same conductive layer.

* * * * *

UNITED STATES PATENT AND TRADEMARK OFFICE
CERTIFICATE OF CORRECTION

PATENT NO. : 10,606,425 B2
APPLICATION NO. : 15/955810
DATED : March 31, 2020
INVENTOR(S) : Ya-Ting Chang et al.

It is certified that error appears in the above-identified patent and that said Letters Patent is hereby corrected as shown below:

On the Title Page

Please replace Item (73) regarding "Assignees" with the following:
(73) Interface Technology (ChengDu) Co., Ltd., Chengdu (CN);
INTERFACE OPTOELECTRONICS (SHENZHEN) CO., LTD., Shenzhen (CN);
GENERAL INTERFACE SOLUTION LIMITED, Zhubei (TW)

Signed and Sealed this
Twenty-second Day of December, 2020

Andrei Iancu
*Director of the United States Patent and Trademark Office*